Sept. 23, 1958  N. LEE  2,853,096
RELIEF VALVE ASSEMBLIES
Filed Jan. 16, 1956
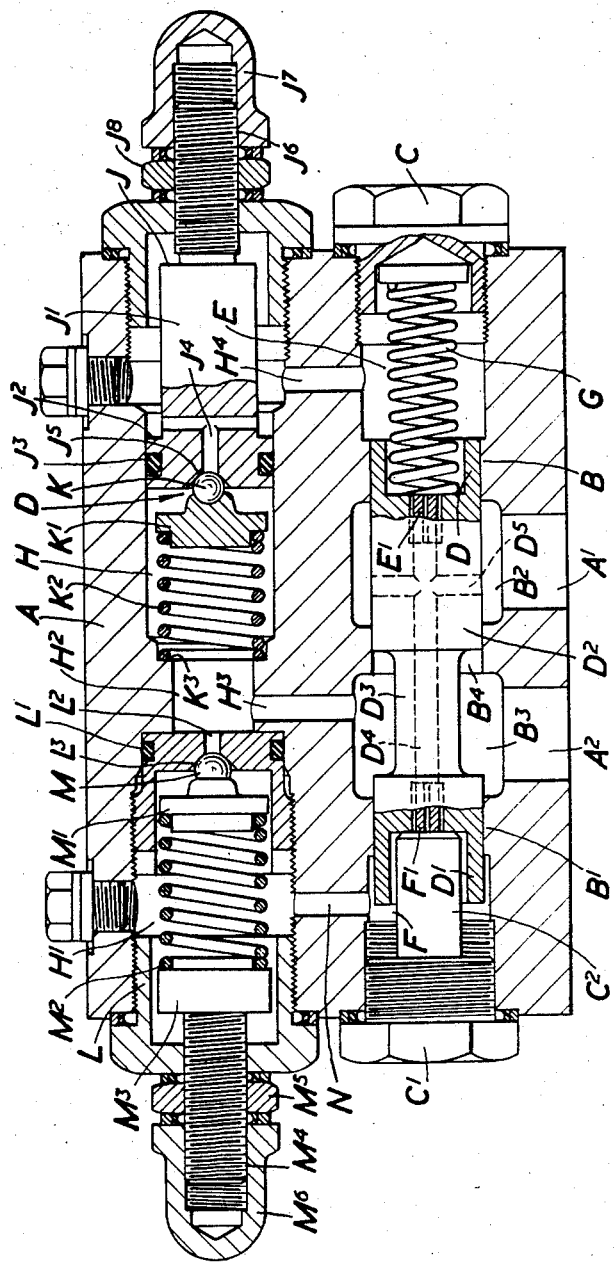
INVENTOR
NORMAN LEE
BY Watson, Cole, Grindle &
Watson ATTORNEYS

United States Patent Office 2,853,096
Patented Sept. 23, 1958

2,853,096

RELIEF VALVE ASSEMBLIES

Norman Lee, Coventry, England, assignor to The Keelavite Company Limited, Allesley, England, a company of Great Britain Application January 16, 1956, Serial No. 559,377

Claims priority, application Great Britain January 28, 1955

10 Claims. (Cl. 137—491)

This invention relates to relief valve assemblies, that is to say apparatus for automatically restricting the pressure difference between two passageways, referred to herein as main passageways, with the aid of a by-pass valve.

An object of the invention is to provide a form of apparatus which will be capable of restricting the pressure difference between the two main passageways in either direction, that is to say where one passageway or the other is at the higher pressure.

According to the invention apparatus for restricting the pressure difference between two main passageways includes a spring closed by-pass valve connected between the passageways, two branches also connected between the main passageways and each including a throttling orifice connected in series with a pressure-responsive non-return pilot valve, one branch being arranged with the orifice on the upstream side of the non-return valve to allow flow in one direction, whilst the other branch is arranged with the orifice on the downstream side to allow flow in the opposite direction, and means for applying the pressure respectively between the one orifice and non-return valve and between the other orifice and non-return valve differentially to the by-pass valve so that flow through the branch having the orifice downstream will produce a rise of pressure in one direction tending to open the by-pass valve, whilst flow in the opposite direction through the branch having the orifice upstream will produce a fall of pressure in the opposite direction, also tending to open the by-pass valve.

The valve may be a piston valve having a plunger movable from a closed position to an open position against the action of a spring and affording opposed piston surfaces, the pressure between the one orifice and pilot valve being applied to one piston surface whilst that between the other orifice and pilot valve is applied to the other piston surface.

In one form of the apparatus the by-pass piston valve affords a pair of flow chambers connected respectively to the two main passageways, and a pair of control pressure chambers, and the plunger has a part shaped to restrict flow between one flow chamber and the other in one position whilst allowing comparatively free flow in another position and affords opposed piston surfaces exposed respectively in the two control pressure chambers, a spring tending to close the valve, a spring-closed non-return valve arranged to permit flow from one control pressure chamber to one flow chamber and a second spring-close non-return valve arranged to permit flow from the said flow chamber to the other control pressure chamber, and a pair of throttling orifices each arranged to permit flow between one of the control pressure chambers and the other flow chamber. In this case the passages connecting one flow chamber to the two control pressure chambers and the throttling orifices therein may be formed or arranged within the plunger.

The intermediate part of the piston valve plunger preferably has a portion of reduced cross-section and passes through the two flow chambers which communicate with each other through a flow port of such size as to allow flow from one flow chamber to the other when the reduced portion is in the port but to prevent it when one end portion is in it. The part may be of circular section so as to be closed by a cylindrical end portion of the plunger, and the reduced portion of the plunger may be of circular section so as to leave an annular flow path through the port.

In use the pressure responsive non-return valves may be set to the same pressure or may be set to different pressures, for example they may be independently adjustable so that their pressure setting can be altered.

The invention may be carried into practice in various ways by one specific embodiment will be described by way of example with reference to the drawing accompanying the provisional specification, which is a sectional side elevation of a relief valve assembly in a plane containing the axes of the piston by-pass valve and the pilot valves.

In the construction illustrated the valve assembly comprises a casing A having formed therein a valve chamber comprising coaxial end portions B, $B^1$ of the same diameter, and axially displaced flow chambers $B^2$, $B^3$ separated by a main port $B^4$ which is coaxial with the portions B, $B^1$ and of the same diameter as them. The flow chambers $B^2$, $B^3$ communicate respectively with inflow and outflow ports $A^1$, $A^2$.

The ends of the valve chamber are closed respectively by a plug member C and by a plug member $C^1$ carrying on its inner face a distance piece or stop $C^2$. Arranged within the valve chamber is a valve member of the piston type comprising end portions D, $D^1$ which make sliding fits respectively with the end portions B, $B^1$ of the valve chamber and form with the ends of the valve chamber control pressure chambers E and F, an intermediate portion $D^2$ which, when the valve member is in its closed position lies partly within and closes the main port $B^4$, and a part $D^3$ of reduced diameter which when the valve member is in its open position extends through the port $B^4$ and thus leaves an annular opening for the passage of fluid between the flow chambers $B^2$ and $B^3$. Formed in the valve member is a longitudinal passage $D^4$ an intermediate point in which communicates with the flow chamber $B^2$ through a cross passage $D^5$ while its ends communicate respectively with the control pressure chambers E and F through restricted throttling orifices $E^1$ and $F^1$. Arranged within the chamber E is a spring G one end of which bears against the plug member C while its other end acts upon the adjacent end of the valve member so as to maintain the valve member normally in engagement with the end of the stop $C^2$ and the valve closed as shown.

Also formed within the casing A are two coaxial pilot valve chambers H and $H^1$ communicating with one another through a passage $H^2$. Disposed within the pilot valve chamber H is a pilot valve assembly comprising a member J having a stem portion $J^1$ and a head portion $J^2$ carrying a sealing ring $J^3$ which thus divides the outer and inner ends of the chamber H from one another. Formed in the member J is a passage $J^4$ leading from the inner to the outer portion of the chamber H and containing at its inner end a valve seat $J^5$ against which normally seats a ball pilot valve K which is acted upon or rigid with a thrust member $K^1$ on which acts one end of a spring $K^2$ the other end of which bears against a shoulder $K^3$ within the chamber H as shown.

The passage $H^2$ communicates by way of a passage $H^3$ with the flow chamber $B^3$ while the outer end of the chamber H communicates through a passage $H^4$ with the control pressure chamber E. Formed on the outer end of the stem $J^1$ of the member J is a screw threaded projection $J^6$ engaged by an adjusting nut $J^7$ and a lock nut $J^8$ whereby the axial position of the member J and hence the force exerted by the spring $K^2$ can be varied.

Disposed within the chamber $H^1$ is a second pilot valve assembly comprising a tubular housing L the inner end of which carries a sealing ring $L^1$ so as to make a fluid tight joint with the wall of the housing, and contains a port $L^2$ the outer end of which is formed as a seating $L^3$ for a ball valve M. The ball valve M is normally maintained in engagement with its seating by a thrust member $M^1$ acting upon it or rigid with it and itself acted upon by one end of a spring $M^2$ the other end of which acts on a thrust member $M^3$ having a screw-threaded stem $M^4$ engaged by adjusting and lock nuts $M^5$, $M^6$ by which its position and hence the force exerted by the spring $M^2$ upon the ball valve M can be adjusted. The interior of the housing L communicates by way of a passage N with the control pressure chamber F.

In operation it will be seen that normally the pressures in the chambers E and F are the same and equal to the pressure in the flow chamber $B^2$ due to the fact that the chambers E and F communicate with this flow chamber through the restricted orifices $E^1$ and $F^1$. If however at any time the pressure in the flow chamber $B^2$ exceeds that in the flow chamber $B^3$ by a predetermined amount sufficient to cause opening of the pilot valve K then the pressure in the control pressure chamber F will exceed that in the control pressure chamber E and, provided that this excess is sufficient to overcome the force of the spring G the valve member D, $D^1$, $D^2$, $D^3$ will move against the action of the spring and open the main port $B^4$ and maintain that port open for as long as the appropriate pressure difference persists. Similarly if at any time the pressure in the flow chamber $B^3$ exceeds that in the flow chamber $B^2$ by an amount sufficient to cause the pilot valve M to open, this will cause the pressure in the control pressure chamber F to exceed that in the control pressure chamber E and again, provided that such excess is sufficient to overcome the force of the spring G the valve member D, $D^1$, $D^2$, $D^3$ will move to open the port $B^4$ and maintain that port open as long as the appropriate pressure difference persists. Moreover the pressure differences at which the two pilot valves K and M respectively open may differ by any desired amount and may be adjusted by adjustment of the adjusting nuts $J^8$ or $M^5$.

In some cases it may be desired that the valve will open when a very small pressure difference exists, in one direction at least, between the chambers $B^2$ and $B^3$ and in this case either the appropriate one of the valves K or M may be replaced by a simple non-return valve arranged to be retained upon its seat by fluid pressure only or with the assistance of a very light spring, or means may be provided by which if the appropriate adjusting nut is adjusted sufficiently in the appropriate direction the valve K or M will be caused to leave its seat and in this case a supplementary simple non-return valve of the kind referred to may be provided in the appropriate passage $J^4$ or $L^2$ by suitable modification.

What I claim as my invention and desire to secure by Letters Patent is:

1. Apparatus for restricting the pressure difference between two main passageways including a by-pass valve connected between the passageways, a spring tending always to close the by-pass valve, two branches also connected between the main passageways and each including a throttling orifice connected in series with a non-return pilot valve, each of said pilot valves having means biasing it to a closed position and being responsive to pressure in a valve opening direction, the pressure responsive non-return pilot valve in one of the said branches being arranged to allow flow between the passageways in one direction whilst the pressure responsive non-return valve in the other branch is arranged to allow flow between the said passageways in the opposite direction, the one throttling orifice in the one branch being in rear of the one non-return valve with respect to the permitted direction of flow in that branch while the other throttling orifice in the other branch is in advance of the other non-return valve with respect to the permitted direction of flow in said other branch and means for applying the pressures respectively in the spaces between the said one orifice and one non-return valve and between the said other orific and other non-return valve differentially in opposite directions to the by-pass valve so that flow through the said one non-return valve having its orifice in rear thereof will produce a relative rise in pressure in the space between the said one non-return valve and the said one orifice relatively to that in the space between the said other non-return valve and other orifice tending to open the by-pass valve, while flow through the said other non-return valve in rear of the said other orifice will produce a fall in pressure in the space between the said other orifice and said other non-return valve relatively to that in the space between the said one orifice and one non-return valve, such relative fall in pressure also tending to open the by-pass valve.

2. Apparatus as claimed in claim 1 in which the by-pass valve is a piston valve having a plunger movable from a closed position to an open position and said means for applying the pressures in opposite directions to the by-passed valve comprising opposed piston surfaces formed integral with said valve, the pressure between the one orifice and pilot valve being applied to one piston surface whilst that between the other orifice and pilot valve is applied to the other piston surface, the spring tending always to move the piston valve into its closed position.

3. Apparatus as claimed in claim 1 in which the respective biasing means of the pressure responsive non-return valves are equal.

4. Apparatus as claimed in claim 1 in which the respective biasing means of the pressure responsive non-turn valves are unequal.

5. Apparatus as claimed in claim 1 in which the respective biasing means of the pressure responsive non-return valves are independently adjustable.

6. Apparatus as claimed in claim 2 in which the by-pass piston valve affords a pair of flow chambers connected respectively to the two main passageways, and the plunger having a part shaped to restrict flow between one flow chamber and the other in one position, the said opposed piston surfaces being exposed respectively to the pressures in said spaces between the said orifices and said non-return valves.

7. Apparatus as claimed in claim 6 in which the passages connecting one flow chamber to the two said spaces and the throttling orifices therein are formed within the plunger.

8. Apparatus as claimed in claim 6, in which the intermediate part of the piston valve plunger has a portion of reduced cross section and passes through the two flow chambers which communicate with each other through a flow port of such size as to allow flow from one flow chamber to the other when the reduced portion is in the port but to prevent it when one end portion is in it.

9. Apparatus as claimed in claim 8 in which the port is of circular section so as to be closed by a cylindrical end portion of the plunger.

10. Apparatus as claimed in claim 8 in which the reduced portion of the plunger is of circular section so as to leave an annular flow path through the port.

References Cited in the file of this patent

UNITED STATES PATENTS

| 2,366,596 | Clifton | Jan. 2, 1945 |
| 2,699,178 | Adams | Jan. 11, 1955 |

FOREIGN PATENTS

| 720,642 | Great Britain | Dec. 22, 1954 |